Figure 9:
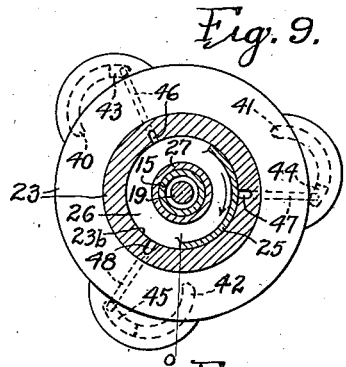

Jan. 12, 1937. G. PLATO 2,067,728
ROTARY MOTOR
Filed Aug. 18, 1934 4 Sheets-Sheet 1
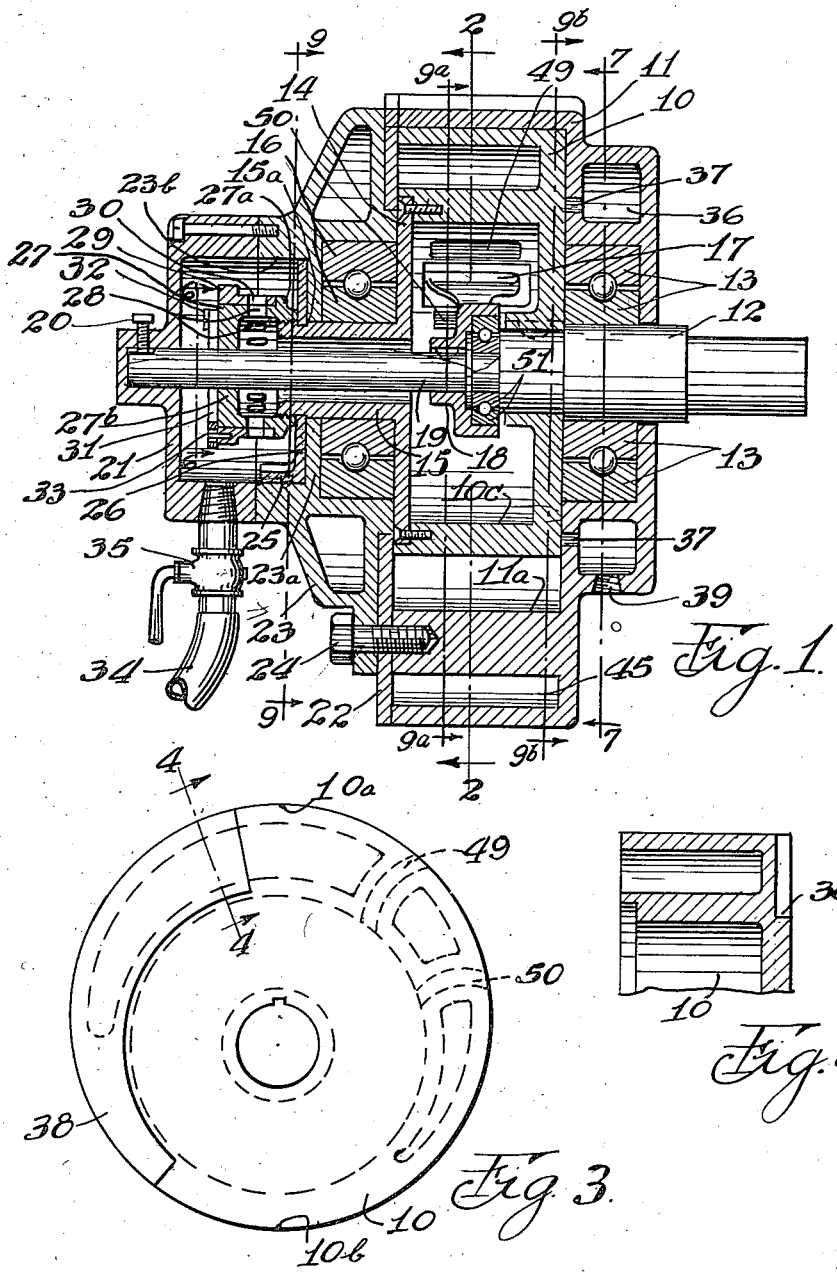
INVENTOR.
GERHARDT PLATO.
BY Albert C. Bell
ATTORNEY.

Jan. 12, 1937.　　　　　G. PLATO　　　2,067,728
ROTARY MOTOR
Filed Aug. 18, 1934　　　4 Sheets-Sheet 2
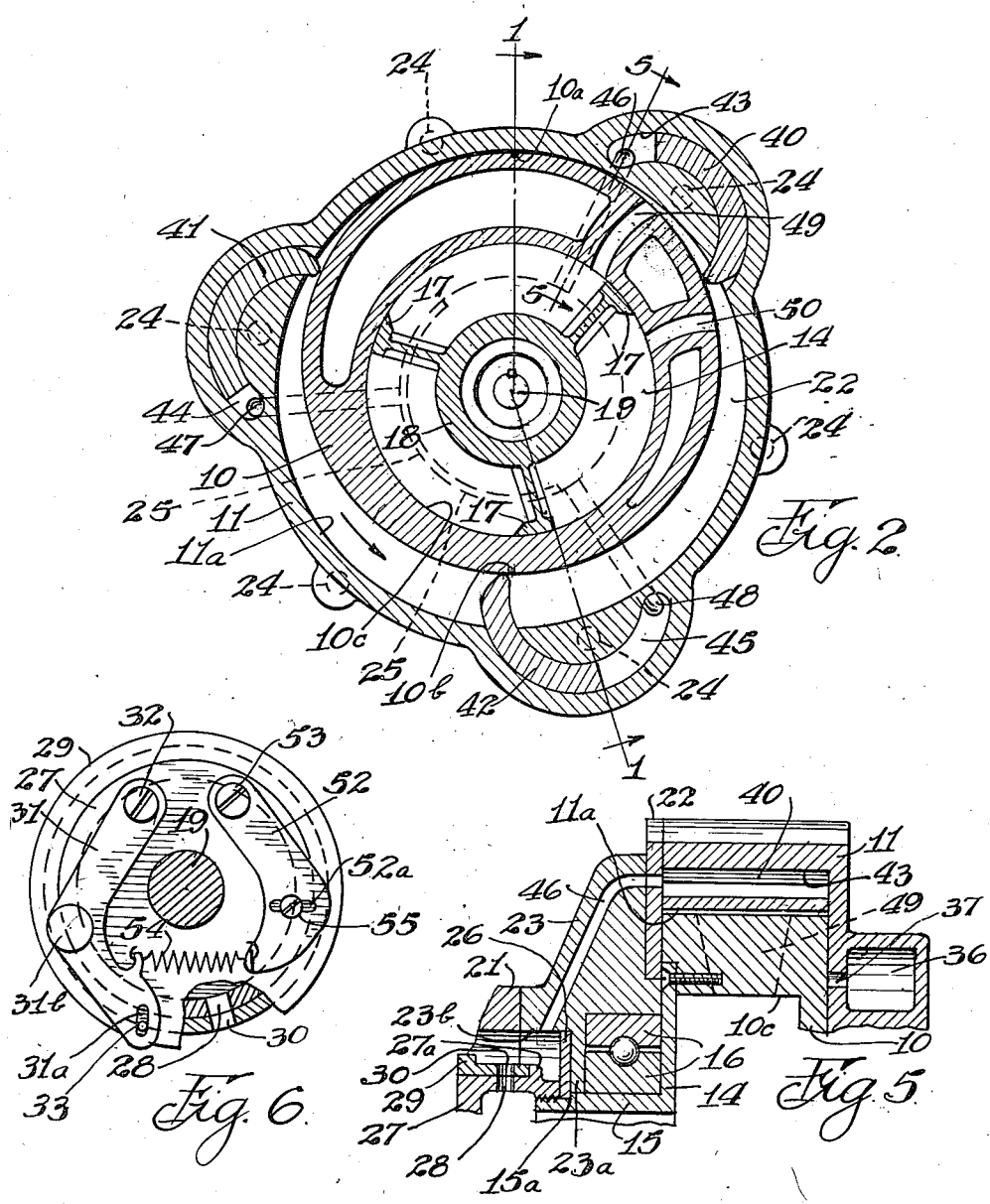
INVENTOR.
GERHARDT PLATO
BY Albert C. Bee
ATTORNEY.

Jan. 12, 1937.　　　　　G. PLATO　　　　　2,067,728
ROTARY MOTOR
Filed Aug. 18, 1934　　　　4 Sheets-Sheet 3
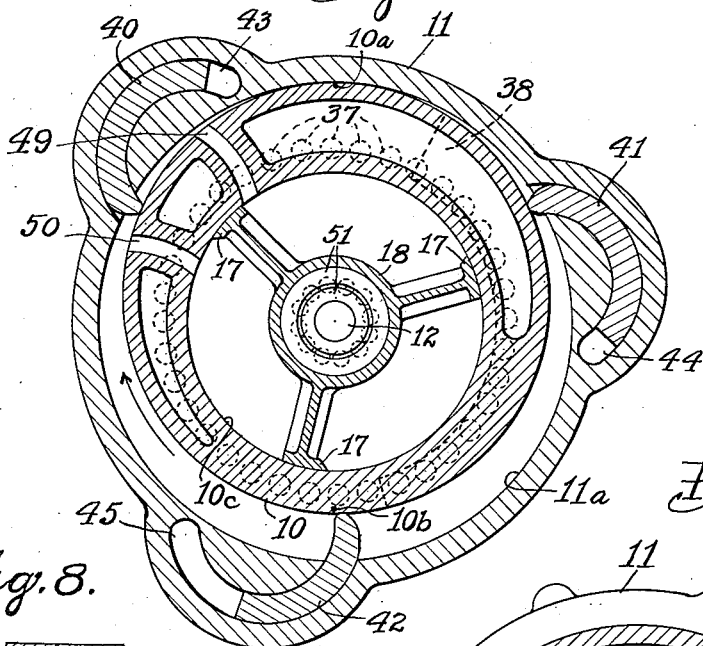
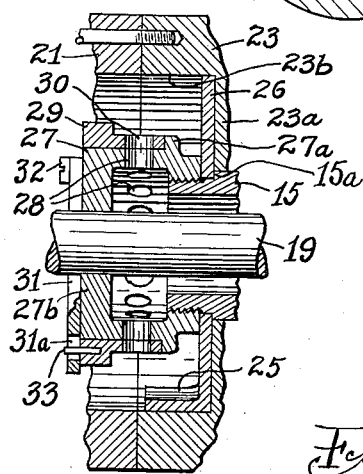
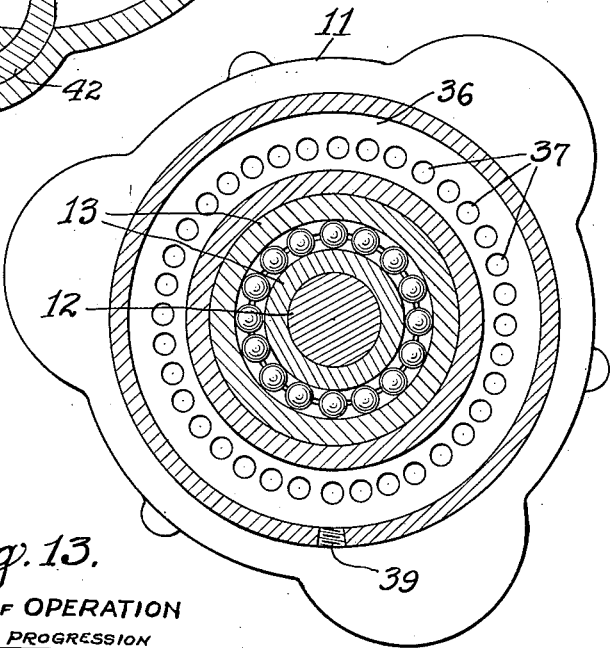
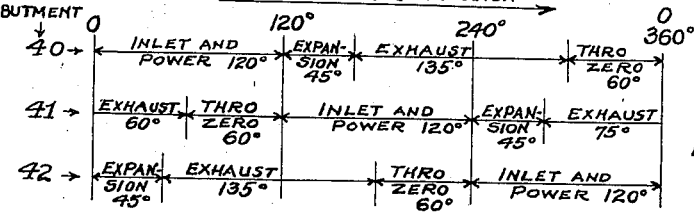
INVENTOR
GERHARDT PLATO
By Albert C. Bell
ATTORNEY Jan. 12, 1937. G. PLATO 2,067,728
ROTARY MOTOR
Filed Aug. 18, 1934 4 Sheets-Sheet 4

INVENTOR
GERHARDT PLATO
BY Albert E. Bell
ATTORNEY

Patented Jan. 12, 1937

2,067,728

UNITED STATES PATENT OFFICE 2,067,728

ROTARY MOTOR

Gerhardt Plato, Chicago, Ill.

Application August 18, 1934, Serial No. 740,492

14 Claims. (Cl. 121—73)

My invention relates to an improvement in rotary motors of the kind in which an eccentrically shaped rotor rotates in a cylindrical bore under the action of suitable fluid pressure. By my invention, I impart to the rotor a plurality of driving impulses for each rotation thereof, by the use of a corresponding number of abutments of novel construction, and I provide means for holding each abutment against the revolving rotor by fluid pressure, during the time it is required to hold the driving fluid in a power compartment, and for freeing said abutment from said holding pressure when it is not subjected to said driving fluid pressure, to the end that the friction of said abutments on the rotor may be a minimum. I also preferably provide for supplying the driving fluid to a power compartment during part of the corresponding driving interval, and interrupting said supply before the end of said interval, completing said driving interval by the expansion of the fluid in the power compartment, exhaust of said used driving fluid beginning at substantially the end of said expansion interval and preferably continuing until somewhat before the beginning of the next power impulse in the same compartment.

While I find it convenient to use air under pressure as the driving fluid, it will be understood that any other fluid adapted to the purpose may be employed. Any desired number of abutments equally spaced around the rotor, may be used as found advisable in any particular case.

Where, as illustrated below, three abutments are employed, there are three power impulses or strokes per rotation of the rotor, each beginning at substantially the time the high point of the rotor passes an abutment with the supply of driving fluid under pressure to the power compartment immediately in front of said abutment, which power impulse or stroke continues until the rotor high point passes under the next abutment, at substantially which time driving fluid is supplied to the power compartment immediately in front of the latter abutment, and the supply of driving fluid to said first power compartment is interrupted, after which the rotor movement continues for a brief interval and substantially until the rotor low point passes said first abutment, before said first power compartment is connected with the exhaust passageway, which exhaust condition preferably continues until just before the rotor high point next passes under said first abutment. The operation described is repeated at each of the abutments, as a result of which there are three power or driving impulses or strokes under the full pressure of the driving fluid, for each rotation of the rotor, each of said impulses or strokes beginning at the end of the said impulse or stroke next preceding it, with an expansion interval in each power compartment overlapping the first portion of the driving or power impulse or stroke in the next power compartment. In this manner a continuous and uniform torque is produced, with smooth and even operation of the motor.

My invention will best be understood by reference to the accompanying drawings illustrating a preferred embodiment thereof, in which Fig. 1 is a longitudinal, vertical sectional view through my motor, taken along the line 1—1 in Fig. 2, Fig. 2 is a transverse, vertical sectional view of the parts shown in Fig. 1, taken along the line 2—2, Fig. 2a is a view similar to Fig. 2 and also taken along the line 2—2 in Fig. 1, the difference between Figs. 2 and 2a being that they are taken in opposite directions, Fig. 3 is a right hand end elevation of the rotor shown in Fig. 1, removed from the motor to more clearly show its construction, Fig. 4 is a sectional view of a part of the structure shown in Fig. 3, taken along the line 4—4, Fig. 5 is a sectional view of a part of the structure shown in Fig. 2, taken along the line 5—5, Fig. 6 is a left hand end elevation to an enlarged scale, of the governor mechanism shown in Fig. 1, taken along the line 6—6, Fig. 7 is a transverse, vertical, sectional view of the parts shown in Fig. 1, taken along the line 7—7.

Figure 9A:
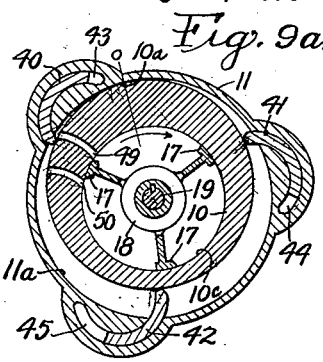
Figure 9B:
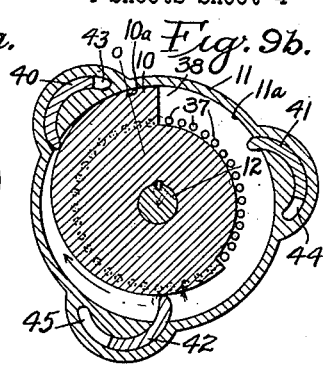
Figure 10:
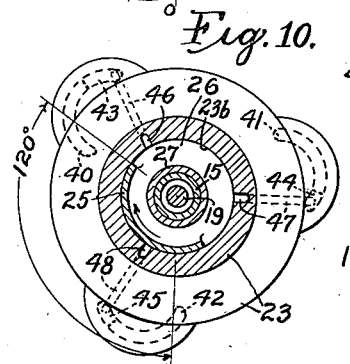
Figure 10A:
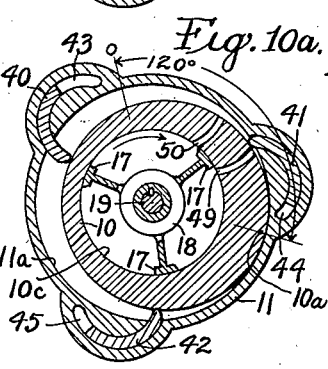
Figure 10B:
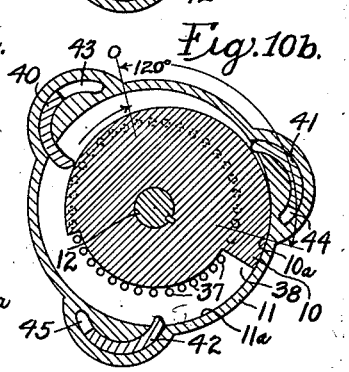
Figure 11:
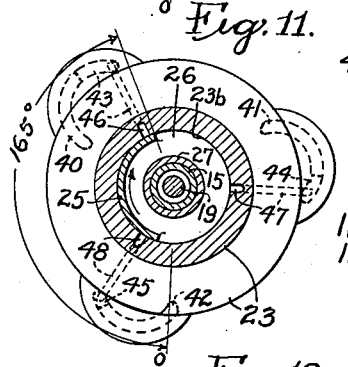
Figure 11A:
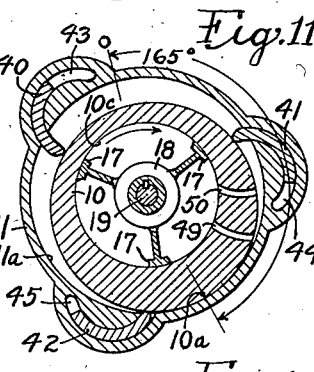
Figure 11B:
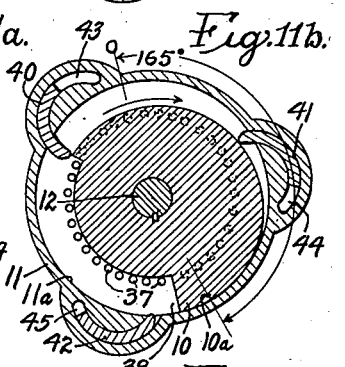
Figure 12:
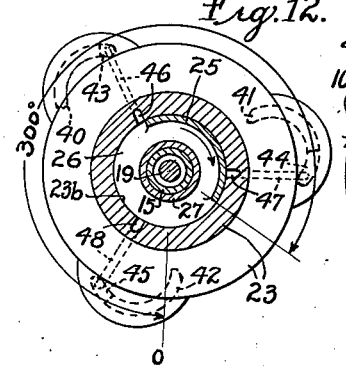
Figure 12A:
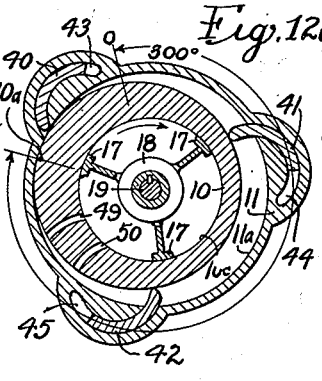
Figure 12B:
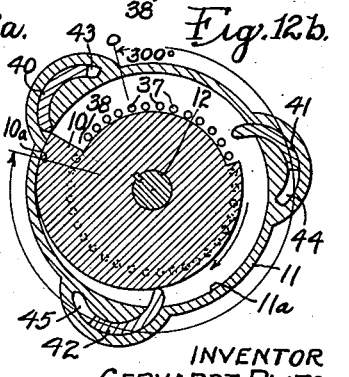

Fig. 8 is a view similar to Fig. 1 and to an enlarged scale, of the parts shown in Fig. 1 involved in holding the disk 26 and shutter 25 in desired adjustment, Fig. 9 is a transverse, vertical, sectional view of the parts shown in Fig. 1, taken along the line 9—9 and to a reduced scale, Fig. 9a is a transverse, vertical, sectional view of the parts shown in Fig. 1, taken along the line 9a—9a and to a reduced scale, Fig. 9b is a transverse, vertical, sectional view of the parts shown in Fig. 1, taken along the line 9b—9b and to a reduced scale, Figs. 10, 10a and 10b are views similar respectively to Figs. 9, 9a and 9b, excepting that in Figs. 10, 10a and 10b, the movable parts are in the position they assume at the end of an inlet or power stroke relatively to the abutment 40, instead of being in the position they assume at the beginning of said stroke as shown in Figs. 9, 9a and 9b, Figs. 11, 11a and 11b are views similar respectively to Figs. 9, 9a and 9b, excepting that they show the movable parts in the position they assume at the beginning of the exhaust stroke relatively to the abutment 40, Figs. 12, 12a and 12b are views similar respectively to Figs. 9, 9a and 9b, excepting that they show the movable parts in the position they assume at the end of the exhaust stroke relatively to the abutment 40, and Fig. 13 is a chart of operation, showing diagrammatically the relation to each other of the component parts or strokes of a cycle of operation of any one of the abutments, as well as the relation of the cycles of operation relatively to the several abutments, to each other.

Similar numerals refer to similar parts throughout the several views.

In Fig. 1, I illustrate my motor as consisting of a rotor 10, mounted for rotation in a casing 11. The rotor 10 is supported in the casing on a shaft 12 to which one of its ends is rigidly secured, by a bearing 13. The other end of the rotor has rigidly secured to it, a disk 14 rigidly secured to a sleeve 15 supported in the casing 11 by a bearing 16. The rotor 10 is provided with an eccentric outer surface, having high and low points 10a and 10b, respectively, as indicated in Fig. 2, said high point being a free turning fit against a bore 11a in the casing made to contain the rotor, and coaxial with the shaft 12. The rotor 10 is provided with a bore 10c concentric with the shaft 12, in which a plurality of shutters 17 are mounted with a sliding fit, on a hub 18 having a rigid and fixed support on the inner end of a rod 19 extending through the sleeve 15 and rigidly secured at its outer end, for example by a set screw 20, in a cap 21 closing the left hand end of the casing 11, said rod being in axial alinement with the shaft 12.

The open end of the casing bore 11a is closed by a flat metal ring 22 held in place between the casing 11 and a casing head 23, by screws 24 extending through said head and said ring into said casing. The head 23 contains the bearing 16 outside of which said head is provided with a thin wall 23a extending inwardly to the sleeve 15. Outside of the wall 23a, the head 23 is provided with a bore 23b concentric with the sleeve 15, in which bore a shutter 25 carried by a disk 26, is a free turning fit. The disk 26 is carried by the sleeve 15 to which it is secured by an internally threaded cup 27 screwed on the outer end of said sleeve, which, as more clearly shown in Fig. 8, clamps said disk tightly against a shoulder 15a on said sleeve, and permits securing the shutter 25 and the disk 26 to the sleeve in any desired angular relation for adjustment purposes. The cup 27 has an outer end wall 27b which extends to and is a free turning fit on the rod 19, and is provided with a circumferential row of admission ports 28 for the driving fluid. A governor sleeve 29 is mounted with a free turning fit on the cup 27, and is provided with a circumferential row of admission ports 30 cooperating with the ports 28 to control the flow of driving fluid to the power compartments of the motor. The inner edge of the governor sleeve rests against a shoulder 27a on the cup 27, and said sleeve is held in place on the cup by a governor arm 31 pivotally connected with the end of said cup at 32, and also movably connected at its other end with the sleeve 29 by a pin 33 and an elongated slot 31a, to move said sleeve 29 angularly on the cup 27, by movement of the arm 31 relatively to said cup.

The interior of the cap 21 forms a supply compartment for driving fluid which may be delivered under pressure to said compartment by a pipe 34 and controlled in any suitable manner, for example by a shut-off valve 35. A substantial clearance is provided between the sleeve 15 and the rod 19, to permit the driving fluid flowing through the ports 30 and 28, to flow freely into the interior of the rotor 10.

The casing 11 is provided with an exhaust passageway 36 surrounding the bearing 13, from which passageway closely spaced exhaust ports 37 occurring entirely around the passageway, extend to the rotor compartment in the casing. The end of the rotor 10 adjacent the ports 37, is provided with a recess 38 as shown in Figs. 3 and 4, extending part way around the circumference of the rotor, permitting exhaust of the used driving fluid through the ports 37 in line at any time with said recess, the end of the rotor serving to close the ports 37 that are not in line with said recess. The passageway 36 is provided with an outlet opening 39 for delivering the exhaust fluid from said passageway.

As shown in Fig. 2, the casing 11 is provided with equally spaced abutments 40, 41 and 42 mounted to slide freely in similarly shaped guideways 43, 44 and 45 respectively, each of said abutments having parallel cylindrical surfaces and being of substantially the same width as the axial length of the rotor 10. The guideways 43, 44 and 45 are connected at their outer end portions, with passageways 46, 47 and 48 respectively opening at their inner ends in equally spaced relation, into the bore 23b in line with the shutter 25, said passageways extending also through the flat ring 22, as more clearly shown for the passageway 46 in Fig. 5. As a result, when any of the passageways 46, 47 and 48 are uncovered at their inner ends by the shutter 25, the fluid pressure in the cap 21 is communicated to the outer ends of the corresponding abutments 40, 41 and 42 to press their inner ends tightly against the outer surface of the rotor 10. The closing of any of said passageways by the shutter 25, relieves the corresponding abutments from the action of the fluid pressure in the cap 21, correspondingly reducing the abutment pressure and friction on the outer surface of the rotor. The free fit of the abutments 40, 41 and 42 in the guideways 43, 44 and 45 respectively, is such as required by the practical limitations of actual construction, as a result of which, leakage may occur along the surfaces of said abutments to avoid what might otherwise be prohibitive pressure of said abutments on the rotor during intervals of closure of the passages 46, 47 and 48 by the shutter 25.

The rotor 10 is provided with two intake ports 49 and 50 separated angularly by substantially the angular extent of each of the shutters 17, and each extending from the rotor bore 10c outwardly and opening through the outer surface of the rotor. The rotor 10 rotates in the direction of the arrow, and the leading intake port 49 is angularly back of the rotor high point 10a, relatively to said direction of rotation, enough to permit the driving fluid to freely enter the power compartment between the rotor and the casing and closed, for example, by the abutment 40 as shown in Fig. 2. The shutters 17 are in line angularly with the inner ends of the abutments 40, 41 and 42 respectively, and each of said shutters is of a size to completely cover the inner end of each of the intake ports 49 and 50 when the outer ends of said ports respectively pass under the inner end of the corresponding abutment. This prevents the flow of driving fluid under pressure against the inner ends of the abutments and avoids vibration of and leakage under the inner ends of the abutments. With the exception of the action of the shutters 17, the intake ports 49 and 50 are continuously in communication with the passageway in the sleeve 15 at all times.

As shown in Fig. 1, the inner end of the rod 19 is supported by a bearing 51 between the inner end of the shaft 12 and the hub 18.

In Fig. 2a, I show the relation of the exhaust recess 38 in the rotor 10, to the several abutments of the motor, and to the annular row of exhaust ports 37 in the end wall of the motor casing, the relation of the movable parts to each other and to the casing, being the same as shown in Fig. 2. This illustrates the relation of the latter part of the exhaust stroke for the abutment 41, to the inlet or power stroke shown in Figs. 2 and 2a as beginning for the abutment 40. It will be understood that by the term "stroke" as used herein, I mean the extent of angular movement of the rotor involved in the event or component part of the cycle, with which the term is used. Fig. 2a also clearly indicates the covering and closing of all of the exhaust ports 37, by the end of the rotor 10, excepting such of the ports 37 as may at any instant open into the recess 38, in view of the end of the rotor involved, being in sliding engagement with the end wall of the casing containing said ports and in view of the construction of the recess as above described.

In Fig. 7, I show the annular form of the exhaust manifold 36, and the opening into said manifold of all of the exhaust ports 37, so that the spent driving fluid delivered into said manifold through any of said ports, may flow freely to and through the exhaust outlet connection 39.

The twelve figures designated 9 to 12b inclusive, are, for purposes of comparison, arranged in vertical columns and in horizontal rows, the figures in any column showing the successive positions of the same movable parts, for the successive events of a cycle of operation, whereas the figures in any row show the several and different movable parts, all in the positions they assume for the particular instant in the cycle of operation depicted in that row. To effect this comparison, these figures are of smaller size than Figs. 2 and 2a, and are somewhat diagrammatic, some of the detail of the complete structure being omitted. In Figs. 9, 9a and 9b, the movable parts are shown at the beginning of an inlet or power stroke, relatively to the abutment 40. In Figs. 10, 10a and 10b the movable parts are shown at the end of said stroke. In Figs. 11, 11a and 11b the movable parts are shown at the beginning of an exhaust stroke, relatively to the abutment 40. In Figs. 12, 12a and 12b, the movable parts are shown at the end of an exhaust stroke relatively to the abutment 40. In Figs. 9, 10, 11 and 12, the shutter 25 is shown in the positions it successively assumes relatively to the abutment controlling passageways 46, 47 and 48, for the several instants above referred to in said cycle of operation. In Figs. 9a, 10a, 11a and 12a, the successive positions of the inlet ports 49 and 50 for the said instants in the cycle of operation, are shown. In Figs. 9b, 10b, 11b and 12b, the successive positions of the exhaust recess 38 relatively to the abutments 40, 41 and 42, for the said instants in the cycle of operation, are shown.

It will be observed by a comparison of Figs. 10a, 11a and 11b, that there is an interval before the beginning of exhaust relatively to the compartment ahead or in front of the abutment 40, during which no driving fluid is supplied to that compartment; this constitutes the expansion interval or stroke, relatively to the abutment 40, where the driving fluid is gaseous, for during this stroke, the confined fluid under pressure expands in said compartment, to continue the imparting of driving effort to the rotor 10.

It will also be observed by a comparison of Figs. 9a and 9b with Figs. 12a and 12b respectively, that there is an inactive interval relatively to the abutment 40, between the end of the exhaust stroke and the beginning of the next inlet or power stroke relatively to said abutment; this interval permits the movement of the high or tangent point 10a of the rotor 10, past the abutment 40, after the preceding exhaust stroke is completed and before the next inlet or power stroke begins, to insure against the possibility of leakage of the driving fluid from the power compartment to the exhaust recess 38; this interval may therefore be referred to as the interval of movement of the rotor through zero relatively to the abutment 40

In Fig. 13 I illustrate diagrammatically the relation of the strokes or intervals of operation of a cycle of operation relatively to the abutment 40, to each other, and also the relation of said strokes or intervals to similar cycles of operation relatively to the abutments 41 and 42 respectively, for one particular embodiment of my invention. In this case, the inlet or power stroke relatively to each abutment, begins at the instant that the inlet or power stroke relatively to the next preceding abutment ceases, whereas with the actual construction illustrated in Figs. 2 and 2a, there is a small overlap of said power strokes due to the port 50 still supplying driving fluid to the compartment on the trailing side of any abutment, at the same time that the port 49 begins the supplying of driving fluid to the compartment ahead of or on the leading side of said abutment, to begin the power stroke in the latter compartment. In view of this, Fig. 13 may be regarded as representing the operation of my motor generically, it being understood that in different motors made in accordance with my invention, the sizes and relationships of the several parts may be varied within the limitations of my invention generically, as may be desirable to meet different requirements.

Thus, in carrying out my invention, the length or extent of each power stroke is determined by the amount of separation of the ports 49 and 50 angularly; again, the length or extent of each expansion stroke is determined by the angular relation of the port 50 to the leading edge of the exhaust recess 38; again, the length or extent of each exhaust stroke is determined by the angular extent of the exhaust recess 38; again, the length or extent of each "through zero" interval, is determined by the angular relation of the port 49 to the trailing edge of the exhaust recess 38; and the relation of successive power strokes as to overlap, is determined by the angular extent of each of the shutters 17. In view of this, I do not limit myself to the particular embodiment, proportions and relations of parts disclosed.

From the above it will appear that the intake ports 49 and 50 have a fixed angular relation to the shutter 25 and to the exhaust recess 38, at all times during the operation of the motor, and that a fixed angular relation is maintained between the shutters 17 and the abutments 40, 41 and 42. As a result, for the position of the rotor shown in Fig. 2, and with the motor in operation, the intake port 49 has just passed the abutment 40 and the corresponding shutter 17, and has begun to supply the power compartment between the casing and the rotor just in front of said abutment, with driving fluid under pressure; just prior to the passage of the port 49 under the abutment 40, the shutter 25 uncovered the inner end of the passageway 46 to subject the outer end of the abutment 40 to the pressure of the driving fluid; also, the power compartment between the abutments 40 and 42 is still being supplied with driving fluid under pressure through the intake port 50, which is about to pass under the abutment 40 to end a power impulse or stroke and begin expansion in said latter compartment, and in so doing, the shutter 25 will be moved to cover the inner end of the passageway 48 and stop supplying driven fluid under pressure to the outer end of the abutment 42; and also, the exhaust recess 38 is in communication with the motor compartment between the abutments 42 and 41 and with the motor compartment between the abutment 41 and the rotor high point 10a, to exhaust the used driving fluid from said motor compartments, said exhaust recess extending from just in front of the rotor high point 10a, forwardly around the rotor and terminating before reaching the rotor low point 10b, the angle between the forward end of said recess and the rotor low point, determining the angle of rotor movement for expansion of the fluid in any power compartment. The extent and adjustment angularly of the shutter 25 are such that the pressure of the driving fluid is exerted on the outer end of each of said abutments beginning just after the rotor high point 10a has passed under said abutment and continuing until about the time that the rotor low point 10b passes under said abutment.

There is thus provided, for example, where my motor is equipped with three abutments as illustrated, a cycle of operation relatively to each abutment, for each rotation of the rotor, starting with the power stroke controlled at its beginning by said abutment, as follows: first, a power stroke produced by supplying driving fluid under pressure to the corresponding power compartment, and continuing for 120 degrees; second, an expansion interval continuing for not to exceed 60 degrees, and preferably for about 45 degrees; third, an exhaust interval continuing for from 120 to 180 degrees depending on the length of the expansion interval, said exhaust interval being preferably of about 135 degrees; and fourth, an interval of about 60 degrees for terminating the exhaust and moving the rotor high point past the abutment controlling the cycle just described, to a position to effectively begin another power stroke controlled by the same abutment at the beginning of the next rotation of the rotor. The cycle described is repeated at each of the abutments for each rotation of the rotor, said cycles overlapping each other as follows: At the end of the power stroke controlled, for example, by the abutment 40, the power stroke controlled by the next abutment in advance, for example, the abutment 41, begins; at the end of the latter power stroke, the power stroke controlled by the next abutment in advance, for example the abutment 42, begins; and at the end of the latter power stroke, completing a rotation of the rotor, the power stroke controlled by the next abutment in advance, for example, the abutment 40, begins, to begin the next rotation of the rotor.

My motor thus develops a continuous and practically constant torque with a single rotor. In carrying out my invention, I do not limit myself to the particular number of abutments shown and described, as it is obvious that the cycle of operation described, may be effected with each one of any plural number of abutments that can be incorporated practically in a motor of the generic type disclosed.

In constructing the motor, the casing, the rotor, and the rotor disk and sleeve are preferably made of cast iron, the casing head and end cap, particularly where the motor is of small size for portable use, being preferably made of aluminum. To afford a suitable bearing surface for the end of the rotor, the flat ring 22 closing the end of the rotor compartment and the ends of the guideways 43, 44 and 45, is preferably made of steel.

The driving fluid employed may be either liquid, for example, water or oil, or gaseous, for example, air or steam. Where the fluid is liquid, the speed of rotation is relatively slow, and to secure any specific power output, the motor must be of much larger size than where a gaseous fluid is employed, since in the latter case the speed of rotation may be relatively high. I find that compressed air serves admirably as a driving fluid, particularly where the motor is of small size for portable use, since the air may be compressed, stored and supplied to the motor without difficulty of any kind, and the used air may be delivered from the motor directly to the atmosphere without undesirable results of any kind, the high speed of rotation possible under such conditions, for example, four thousand or more revolutions per minute with portable motors that are small enough to be classed as hand tools, giving such motors a large power output relatively to their weight.

Any desired tools, for example, drills, grinding wheels, buffing wheels, etc., adapted to operate at the speed of the motor, may be mounted on the shaft 12 in any desired manner well known in the art, or said shaft may in other cases be connected in any other known way with the device or devices to be driven.

Where it is desired to operate the motor within narrow speed limits for substantial variations in load, I prefer to employ the governing mechanism shown in detail in Fig. 6, as illustrative of governing mechanism generally that may be employed to effect said speed control, since I do not limit myself to the use of the specific governing mechanism illustrated. As shown in Fig. 6, the arm 31 is angular in form to extend around the rod 19, and also at its mid-portion to overlap the edge of the sleeve 29 when said arm is in its innermost position, to retain said sleeve in place on the cup 27. The free end of the arm 31 is provided with a short longitudinal slot 31a, to receive the outer end of the pin 33, so that angular movement of said arm 31 on its pivotal support 32, will effect angular movement of the sleeve 29 on the cup 27 and change the effective size of the ports 28 and 30. The parts are preferably constructed and adjusted so that the ports 28 and 30 are respectively in line with each other and fully opened, when the arm 31 is in its lower speed and full load position. A second angular arm 52 is pivotally connected at 53 to the end of the cup 27, to extend around the side of the rod 19 remote from the arm 31, to also overlap the edge of the sleeve 29. The free end of the arm 52 is connected by a tension spring 54 with the arm 31, and is also provided with a slot 52a through which a clamping screw 55 extends into the end of the cup 27. By loosening the screw 55 and turning the arm 52 on its pivotal support 53 and then tightening the screw 55, any desired tensional adjustment may be imparted to the spring 54. The arm 31 carries a weight 31b, to develop the requisite centrifugal force by rotation of the cup 27, to close the ports 28 and 30 sufficiently by angular movement of the sleeve 29 on said cup, by the outward movement of said arm 31, to limit the rotation of the motor to a desired maximum speed, depending upon the adjustment of the spring 54, when the motor is in operation without load.

While I have shown my invention in the particular embodiment above described, it will be understood that I do not limit myself to this exact construction as I may employ equivalents known to the art at the time of the filing of this application without departing from the scope of the appended claims.

What I claim is:

1. In a rotary motor, the combination of a casing having a cylindrical bore and end walls, a rotary shaft extending into said bore coaxially therewith, a rotor in said bore and fitting the end walls thereof and secured to said shaft, said rotor having a cylindrical outer surface eccentrically disposed relatively to the axis of said shaft and a free fit at its high point in said cylindrical bore, a plurality of abutments carried by said casing and equally spaced angularly and movable into and from said cylindrical bore to engage the outer surface of said rotor, said rotor being hollow, a disk enclosing the space in said rotor, a sleeve extending from said disk away from and in axial alinement with said shaft, said rotor having an intake port extending therethrough radially and back of said rotor high point, the end of said rotor remote from said disk having an exhaust recess extending around said rotor from in front of said rotor high point forwardly and stopping back of the low point of said rotor, said casing having an annular exhaust passageway therein adjacent the recessed end of said rotor and an annular row of exhaust ports from said exhaust passageway into said cylindrical bore in line with said rotor recess and closed by the unrecessed portion of the recessed end of said rotor, and means for supplying fluid under pressure to said sleeve and thereby to the interior of said rotor.

2. In a rotary motor, the combination of a casing having a cylindrical bore and end walls, a rotary shaft extending into said bore coaxially therewith, a rotor in said bore and fitting the end walls thereof and secured to said shaft, said rotor having a cylindrical outer surface eccentrically disposed relatively to the axis of said shaft and a free fit at its high point in said cylindrical bore, a plurality of abutments carried by said casing and equally spaced angularly and movable into and from said cylindrical bore to engage the outer surface of said rotor, said rotor being hollow, a disk enclosing the space in said rotor, a sleeve extending from said disk away from and in axial alinement with said shaft, said rotor having an intake port extending therethrough radially and back of said rotor high point, the end of said rotor remote from said disk having an exhaust recess extending around said rotor from in front of said rotor high point forwardly and stopping back of the low point of said rotor, said casing having an annular exhaust passageway therein adjacent the recessed end of said rotor and an annular row of exhaust ports from said exhaust passageway into said cylindrical bore in line with said rotor recess and closed by the unrecessed portion of the recessed end of said rotor, means for supplying fluid under pressure to said sleeve and thereby to the interior of said rotor, a cap extending from said casing around the outer end of said sleeve to hold the driving fluid supplied to said sleeve, said casing having an abutment passageway extending from the outer end of each of said abutments into the space enclosed by said cap, and a shutter carried by said sleeve and opening each of said abutment passageways during each interval that the corresponding abutment is subjected to the pressure of said driving fluid through said intake port and closing each of said abutment passages during each interval that the corresponding abutment is a wall of a rotor compartment from which the spent driving fluid is being exhausted.

3. In a rotary motor, the combination of a casing having a cylindrical bore and end walls, a rotary shaft extending into said bore coaxially therewith, a rotor in said bore and fitting the end walls thereof and secured to said shaft, said rotor having a cylindrical outer surface eccentrically disposed relatively to the axis of said shaft and a free fit at its high point in said cylindrical bore, a plurality of abutments carried by said casing and equally spaced angularly and movable into and from said cylindrical bore to engage the outer surface of said rotor, said rotor being hollow, a disk enclosing the space in said rotor, a sleeve extending from said disk away from and in axial alinement with said shaft, said rotor having two annularly spaced intake ports extending therethrough radially and back of said rotor high point, the end of said rotor remote from said disk having an exhaust recess extending around said rotor from in front of said rotor high point forwardly and stopping back of the low point of said rotor, said casing having an annular exhaust passageway therein adjacent the recessed end of said rotor and an annular row of exhaust ports from said exhaust passageway into said cylindrical bore in line with said rotor recess and closed by the unrecessed portion of the recessed end of said rotor, means for supplying fluid under pressure to said sleeve and thereby to the interior of said rotor, and a stationary shutter inside of said rotor to close each of said intake ports as it passes under each of said abutments.

4. In a rotary motor, the combination of a casing having a cylindrical bore and end walls, a rotary shaft extending into said bore coaxially therewith, a rotor in said bore and fitting the end walls thereof and secured to said shaft, said rotor having a cylindrical outer surface eccentrically disposed relatively to the axis of said shaft and a free fit at its high point in said cylindrical bore, a plurality of abutments carried by said casing and equally spaced angularly and movable into and from said cylindrical bore to engage the outer surface of said rotor, said rotor being hollow, a disk enclosing the space in said rotor, a sleeve extending from said disk away from and in axial alinement with said shaft, said rotor having an intake port extending therethrough radially and back of said rotor high point, the end of said rotor remote from said disk having an exhaust recess extending around said rotor from in front of said rotor high point forwardly and stopping back of the low point of said rotor, said casing having an annular exhaust passageway therein adjacent the recessed end of said rotor and an annular row of exhaust ports from said exhaust passageway into said cylindrical bore in line with said rotor recess and closed by the unrecessed portion of the recessed end of said rotor, means for supplying fluid under pressure to said sleeve and thereby to the interior of said rotor, and a stationary shutter inside of said rotor to close said intake port as it passes under each of said abutments.

5. In a rotary motor, the combination of a casing having a cylindrical bore, a rotor mounted in said bore for rotation therein around the axis of said bore, said rotor having an eccentric outer surface engaging said bore at the high point of said eccentric surface, said rotor having a bore coaxial with said casing bore, a plurality of equally spaced abutments carried by said casing and movable into and from said bore to engage said rotor, said rotor having an intake port extending radially therethrough back of said rotor high point, means for supplying driving fluid under pressure to the interior of said rotor, means for exhausting the spent driving fluid from said casing bore, and a stationary shutter engaging said rotor bore closing said intake port as it passes under the corresponding abutment.

6. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, means for exhausting the spent driving fluid from said casing bore, said fluid supplying means including a compartment in said casing for containing said fluid under pressure, said casing having a passageway from the outer portion of each of said abutments into said compartment, and a shutter in said compartment and carried by said rotor and closing each of said passageways when the corresponding abutment is not subjected to the pressure of said driving fluid.

7. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, means for exhausting the spent driving fluid from said casing bore, each of said abutments having parallel opposite faces, and said casing having guideways fitting the faces of said abutments, said fluid supplying means including a compartment in said casing for containing said fluid under pressure, said casing having a passageway from the outer portion of each of said guideways into said compartment, and a shutter in said compartment and carried by said rotor and closing each of said passageways when the corresponding abutment is not subjected to the pressure of said driving fluid.

8. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, means for exhausting the spent driving fluid from said casing bore, each of said abutments being curved and having parallel and cylindrical opposite faces, and said casing having guideways fitting the faces of said abutments, said fluid supplying means including a compartment in said casing for containing said fluid under pressure, said casing having a passageway from the outer portion of each of said guideways into said compartment, and a shutter in said compartment and carried by said rotor and closing each of said passageways when the corresponding abutment is not subjected to the pressure of said driving fluid.

9. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, said casing having an annular and continuous row of exhaust ports extending outwardly through one end of said casing bore and nearer the axis of said casing bore than is the low point of said rotor eccentric surface, said rotor having an end exhaust recess uncovering said exhaust ports to exhaust spent driving fluid from said casing bore, the recessed end of said rotor otherwise closing said exhaust ports.

10. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, said casing having an annular and continuous row of exhaust ports extending outwardly through one end of said casing bore and nearer the axis of said casing bore than is the low point of said rotor eccentric surface, said rotor having an end exhaust recess uncovering said exhaust ports to exhaust spent driving fluid from said casing bore, the recessed end of said rotor otherwise closing said exhaust ports, the leading end of said exhaust recess being spaced back of the low point of said rotor eccentric surface to provide a fluid expansion interval immediately following each fluid pressure stroke at each of said abutments.

11. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, said casing having an annular and continuous row of exhaust ports extending outwardly through one end of said casing bore and nearer the axis of said casing bore than is the low point of said rotor eccentric surface, said rotor having an end exhaust recess uncovering said exhaust ports to exhaust spent driving fluid from said casing bore, the recessed end of said rotor otherwise closing said exhaust ports, the trailing end of said exhaust recess being ahead of and spaced from said intake port to provide a substantial interval between the end of an exhaust stroke at each of said abutments and the beginning of the next power stroke at the same abutment.

12. In a rotary motor, the combination of a casing having a cylindrical bore, a rotor mounted in said bore for rotation therein around the axis of said bore, said rotor having an eccentric outer surface engaging said bore at the high point of said eccentric surface, said rotor being hollow, a plurality of equally spaced abutments carried by said casing and movable into and from said bore to engage said rotor, said rotor having an intake port extending radially therethrough back of said rotor high point, means for supplying driving fluid under pressure to the interior of said rotor, and means for exhausting the spent driving fluid from said casing bore, said exhausting means including an end recess in said rotor and cooperating exhaust ports in said casing, said intake port being spaced from said recess angularly and said recess having an angular extent of less than 180 degrees, whereby a cycle of operation is provided at each of said abutments for each rotation of said rotor consisting first of a power stroke, then an expansion stroke, then an exhaust stroke, and then an inactive interval completing said rotation and bringing the parts into position to begin the next cycle at the same abutment, the power stroke at each abutment beginning at substantially the end of the power stroke at the next abutment back of it.

13. In a rotary motor, the combination of a casing having a cylindrical bore, a rotor mounted in said bore for rotation therein around the axis of said bore, said rotor having an eccentric outer surface engaging said bore at the high point of said eccentric surface, said rotor having a bore coaxial with said casing bore, a plurality of equally spaced abutments carried by said casing and movable into and from said bore to engage said rotor, said rotor having two spaced intake ports extending radially therethrough back of said rotor high point, means for supplying driving fluid under pressure to the interior of said rotor, means for exhausting the spent driving fluid from said casing bore, and a stationary shutter engaging said rotor bore closing each of said intake ports as it passes under the corresponding abutment.

14. In a rotary motor, the combination of a casing having a cylindrical bore, a rotor mounted in said bore for rotation therein around the axis of said bore, said rotor having an eccentric outer surface engaging said bore at the high point of said eccentric surface, said rotor having a bore coaxial with said casing bore, a plurality of equally spaced abutments carried by said casing and movable into and from said bore to engage said rotor, said rotor having two spaced intake ports extending radially therethrough back of said rotor high point, means for supplying driving fluid under pressure to the interior of said rotor, means for exhausting the spent driving fluid from said casing bore, a stationary shutter engaging said rotor bore closing each of said intake ports as it passes under the corresponding abutment, said fluid supplying means including a compartment in said casing for containing said fluid under pressure, said casing having a passageway from the outer portion of each of said abutments into said compartment, and a rotary shutter in said compartment and carried by said rotor and closing each of said passageways when the corresponding abutment is not subjected to the pressure of said driving fluid.

GERHARDT PLATO.